(12) United States Patent
Rybak et al.

(10) Patent No.: US 9,667,631 B2
(45) Date of Patent: *May 30, 2017

(54) VENUE-SPECIFIC WI-FI CONNECTIVITY NOTIFICATIONS

(71) Applicant: Google Inc., Mountain View, CA (US)

(72) Inventors: Alexander Rybak, San Francisco, CA (US); Alain Ayoub, San Jose, CA (US); Ezra Gorman, Portland, OR (US); Priscilla Dao Pham, Mountain View, CA (US); Vivek Sekhar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,836

(22) Filed: May 18, 2016

(65) Prior Publication Data

US 2016/0269413 A1 Sep. 15, 2016

Related U.S. Application Data

(63) Continuation of application No. 14/471,606, filed on Aug. 28, 2014, now Pat. No. 9,374,664.

(51) Int. Cl.
*H04L 29/06* (2006.01)
*H04W 4/02* (2009.01)
(Continued)

(52) U.S. Cl.
CPC .......... *H04L 63/10* (2013.01); *H04L 63/0876* (2013.01); *H04L 67/26* (2013.01);
(Continued)

(58) Field of Classification Search
CPC ..... H04L 63/10; H04L 67/26; H04L 63/0876; H04W 68/00; H04W 12/10; H04W 4/02;
(Continued)

(56) References Cited

U.S. PATENT DOCUMENTS

2007/0213033 A1 9/2007 Alper et al.
2013/0091279 A1 4/2013 Haddad et al.
(Continued)

FOREIGN PATENT DOCUMENTS

KR 1020140055675 5/2014
WO WO-2010/099451 A2 9/2010
(Continued)

OTHER PUBLICATIONS

International Search Report for Application No. PCT/2015/031062 dated Jul. 27, 2015.

*Primary Examiner* — Duc C Ho
(74) *Attorney, Agent, or Firm* — Honigman Miller Schwartz and Cohn LLP

(57) ABSTRACT

A method includes receiving a wireless connection request at a backend computing device from a user device to allow wireless connection of the user device to a network through an access point located at a venue. The connection request includes a user identifier. The method includes validating the user identifier and granting wireless access of the user device to the access point when the user identifier is valid. The method further includes transmitting a venue-specific notification to the user device when the user device connects to the network.

30 Claims, 7 Drawing Sheets

(51) Int. Cl.
*H04W 68/00* (2009.01)
*H04W 12/10* (2009.01)
*H04W 88/08* (2009.01)
*H04W 48/04* (2009.01)
*H04W 12/08* (2009.01)
*H04L 29/08* (2006.01)
*H04W 12/06* (2009.01)
*H04W 48/14* (2009.01)
*H04W 76/02* (2009.01)
*H04W 88/12* (2009.01)

(52) U.S. Cl.
CPC ............. *H04W 4/02* (2013.01); *H04W 12/06* (2013.01); *H04W 12/08* (2013.01); *H04W 12/10* (2013.01); *H04W 48/04* (2013.01); *H04W 48/14* (2013.01); *H04W 68/00* (2013.01); *H04W 76/02* (2013.01); *H04W 88/08* (2013.01); *H04W 88/12* (2013.01)

(58) Field of Classification Search
CPC ..... H04W 12/06; H04W 12/08; H04W 48/04; H04W 48/14; H04W 76/02; H04W 88/08; H04W 88/12
USPC ....................................................... 709/225
See application file for complete search history.

(56) References Cited

U.S. PATENT DOCUMENTS

2013/0167196 A1* 6/2013 Spencer .................. H04W 8/22
726/3
2014/0106743 A1 4/2014 Ferraro Esparza et al.
2015/0347683 A1* 12/2015 Ansari .................... H04L 63/08
726/7
2015/0351008 A1* 12/2015 Mayor .................. H04W 48/16
455/41.2

FOREIGN PATENT DOCUMENTS

WO WO-2014015434 A1 1/2014
WO WO-2014/057459 A2 4/2014

* cited by examiner

VENUE-SPECIFIC WI-FI CONNECTIVITY NOTIFICATIONS

CROSS REFERENCE TO RELATED APPLICATIONS

This U.S. patent application is a continuation of, and claims priority under 35 U.S.C. §120 from, U.S. patent application Ser. No. 14/471,606, filed on Aug. 28, 2014, which is hereby incorporated by reference in its entirety.

TECHNICAL FIELD

This disclosure relates to wireless access to networks through access points located at venues and methods of notifying user devices when they connect to networks.

BACKGROUND

Providing customers guest access to wireless networks is commonly offered as a service by restaurants, coffee shops, shopping facilities, or other venues. When a user device is connected to an access point located in a venue, the wireless networks deliver internet access to the user devices. Users may gain access to the internet by using a service set identifier (SSID) associated with wireless network. For instance, users may be required to enter a captive portal maintained by the venue, whereat the users may input a pre-shared SSID/password combination to gain access to the internet. While the captive portal is a valuable tool for allowing the venue to engage with its client base, captive portals are sub-optimal to the user/client experience, because several steps are required to connect to the wireless network for gaining access to the internet.

SUMMARY

One aspect of the disclosure provides a method that includes receiving, at a backend computing device, a wireless connection request from a user device to allow wireless connection of the user device to a network through an access point located at a venue. The connection request includes a user identifier. The method includes, validating the user identifier at the backend computing device and granting wireless access of the user device to the access point when the user identifier is valid. The method further includes transmitting a venue-specific notification from the backend computing device to the user device when the user device connects to the network.

Implementations of the disclosure may include one or more of the following optional features. In some implementations, the method includes receiving the connection request at the backend computing device from the user device through the access point when the user device is within a wireless coverage area of the access point. Optionally, when the backend computing device receives the connection request from the user device, the method may include identifying that the user device is located within a wireless coverage area of the access point. In some implementations, the method includes receiving a registration request at the backend computing device from the user device. In response to the registration request, the method may optionally include generating a user record including the user identifier, storing the user record in non-transitory memory in communication with the backend computing device, and transmitting the user identifier from the backend computing device to the user device. The user record may optionally include a media access control address associated with the user device and/or application information associated with one or more applications executing on the user device and initiating the registration request.

In some examples, the method includes retrieving venue-specific information from the non-transitory memory in communication with the backend computing device using an access point identifier included in the connection request. The method may include generating the venue-specific notification based upon the retrieved venue-specific information. In some instances, the method includes determining that the venue-specific information includes a venue application identifier when the backend computing device retrieves the venue-specific information. In response to the venue application identifier, the method may optionally include querying a user record stored in the non-transitory memory to determine if the user record includes the venue application identifier associated with the venue. In some examples, when the user record includes the venue application identifier, the method may optionally include generating the venue-specific notification based upon the retrieved venue-specific information including the venue application identifier. In other examples, the method includes retrieving application information from the non-transitory memory in communication with the backend computing device using the user identifier included in the connection request. The application information may relate to one or more applications executing on the user device and initiating the connection request. Based upon the application information, the method may include generating the venue-specific notification. In some implementations, the user record contains information about the user and his/her devices. A separate record in the non-transitory memory in communication with the backend computing device (e.g., in a data base) associates the access point with the venue information. In response to an authorization request (connection request), the method may include executing a lookup (e.g., on the non-transitory memory in communication with the backend computing device) of both the user information (e.g., based on device information) and the venue information (e.g., based on access point information).

In some implementations, the method includes identifying when the user device connects to the network. Optionally, the method may include transmitting the venue-specific notification as a push notification from the backend computing device to the user device in response to the backend computing device identifying when the user device connects to the network.

In other implementations, the method includes receiving a notification request at the backend computing device from the user device to fetch any pending venue-specific notifications available for the user device. The user device may execute one or more applications that initiate the notification request when the user device connects to the network. In response to the notification request, the method may optionally include retrieving the venue-specific notification from the non-transitory memory in communication with the backend computing device and transmitting the venue-specific notification from the backend computing device to the user device.

In some implementations, the method includes publishing the venue-specific notification for the user device to look-up when the user device connects to the network. The method may include receiving a notification at the backend computing device from the user device to get the published venue-specific notification. The user device may execute one or more applications that initiate the notification request when the user device connects to the network. In response to the notification request, the method may optionally include retrieving the published venue-specific notification from the non-transitory memory in communication with the backend computing device and transmitting the venue-specific notification from the backend computing device to the user device.

In some examples, the venue-specific notification transmitted from the backend computing device prompts an application executing on the user device to render the venue-specific notification for display upon a graphical user interface executing on the user device. The venue-specific notification may indicate to the user that the user device has connected to the network. Optionally, the venue-specific notification displayed upon the graphical user interface may prompt the user to initiate one or more actions. The one or more actions may optionally include opening a uniform resource locator associated with the venue, open a venue-specific application associated with the venue executing on the user device, dismiss the venue-specific notification, expand the venue-specific notification and initiate an explicit intent of the venue-specific application when the venue-specific application is executing on the user device.

Another aspect of the disclosure provides a system that includes one or more shared backend processing devices that execute a shared backend, one or more validation service processing devices in communication with the one or more shared backend processing devices and that execute a validation service, and one or more notification system processing devices in communication with the one or more validation service processing devices and that execute a notification system. The shared backend receives a wireless connection request from a user device to allow wireless connection of the user device to a network through an access point located at a venue. The shared backend link validates the user identifier. The validation service grants wireless access of the user device to the access point when the user identifier is valid. The notification system transmits a venue-specific notification to the user device when the user device connects to the network.

This aspect may include one or more of the following optional features. In some implementations, the shared backend receives the connection request from the user device through the access point when the user device is within a wireless coverage area of the access point. Optionally, the shared backend may identify that the user device is located within a wireless coverage area of the access point when receiving the connection request from the user device. In some examples, the shared backend transmits a connection authorization command to the access point. The connection authorization command may permit the access point to connect the user device to the network.

In some implementations, the remote system further includes one or more shared credential processing devices that execute a shared credential application program interface (API) and one or more registration service processing devices in communication with the one or more shared credential processing devices that execute a registration service. Optionally, the shared credential API may receive a registration request from the user device and transmit the user identifier to the user device. Optionally, the registration service may generate a user record including the user record in response to the registration request and optionally store the user record in data storage in communication with the registration service. In some examples, the user record includes a media access control address associated with the user device. In other examples, the user record includes application information associated with one or more applications executing on the user device and initiating the registration request.

In some examples, the validation service retrieves venue-specific information from non-transitory memory in communication with the validation service using an access point identifier included in the connection request. Based upon the retrieved venue-specific information, the validation service may generate the venue-specific notification. In some instances, the validation service may determine that the venue-specific information includes a venue application identifier when the validation service retrieves the venue-specific information. In response to the venue application identifier, the validation service may optionally query a user record stored in the data storage to determine if the user record includes the venue application identifier associated with the venue. When the user record includes the venue application identifier, the validation service may optionally generate the venue-specific notification based upon the retrieved venue-specific information including the venue application identifier. In other examples, the validation service retrieves application information from data storage in communication with the validation service using the user identifier included in the connection request. The application information may relate to one or more applications executing on the user device and initiating the connection request. Based upon the application information, the validation service may generate the venue-specific notification.

In some implementations, the notification system identifies when the user device connects to the network. Optionally, the notification system may transmit the venue-specific notification as a push notification to the user device in response to the backend computing device identifying when the user device connects to the network.

In other implementations, the notification system receives a notification request from the user device to fetch any pending venue-specific notifications available for the user device. The user device may execute one or more applications that initiate the notification request when the user device connects to the network. In response to the notification request, the notification system may optionally retrieve the venue-specific notification from data storage in communication with the notification system and transmit the venue-specific notification to the user device.

In some implementations, the notification system publishes the venue-specific notification for the user device to look-up when the user device connects to the network. The notification system may receive a notification from the user device to get the published venue-specific notification. The user device may execute one or more applications that initiate the notification request when the user device connects to the network. In response to the notification request, the notification system may optionally retrieve the published venue-specific notification from data storage in communication with the notification system and transmit the venue-specific notification to the user device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
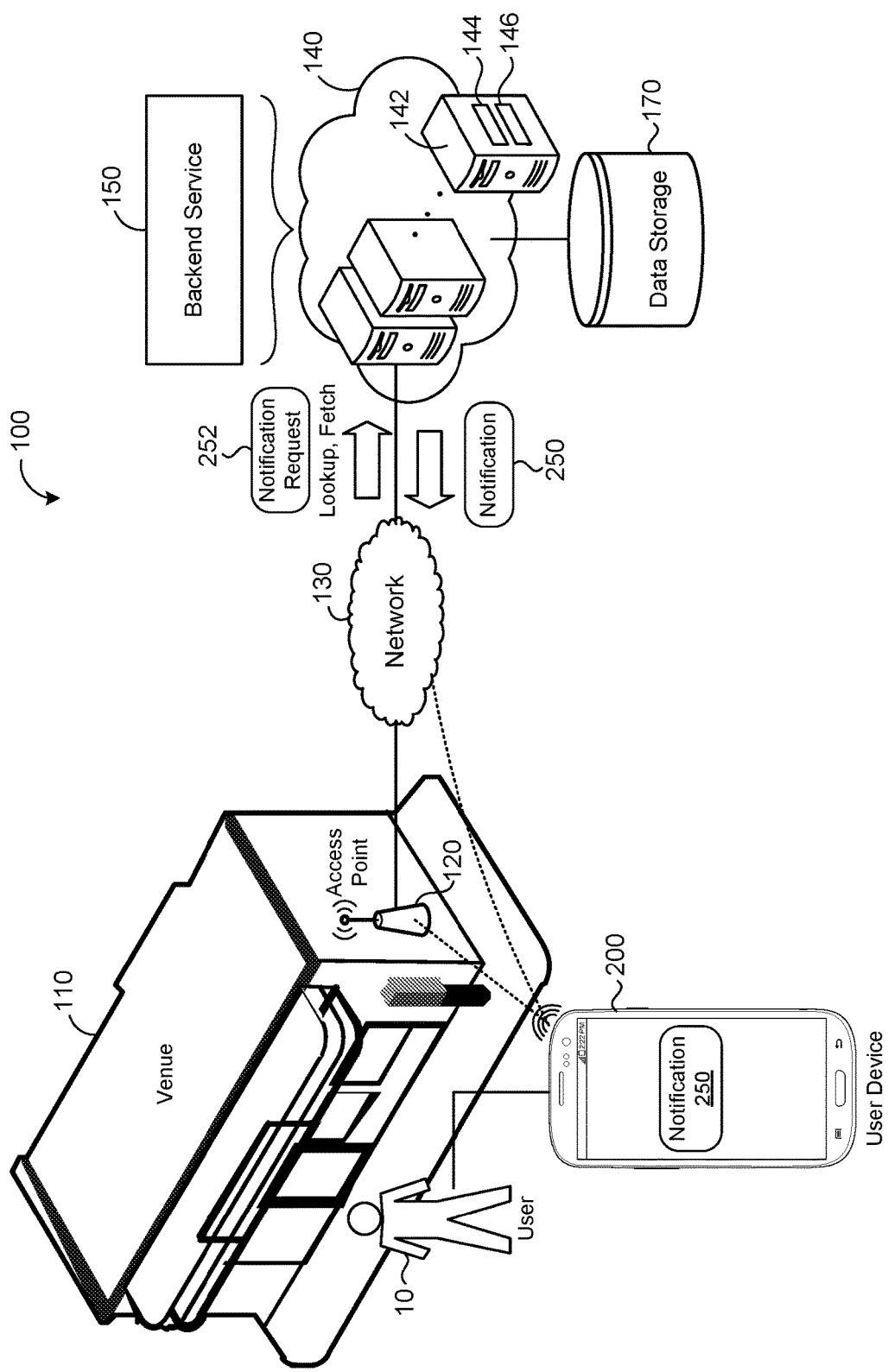
FIG. 1 is a schematic view of an example system for providing a user device guest access to a network provided by a venue.
Figure 3:
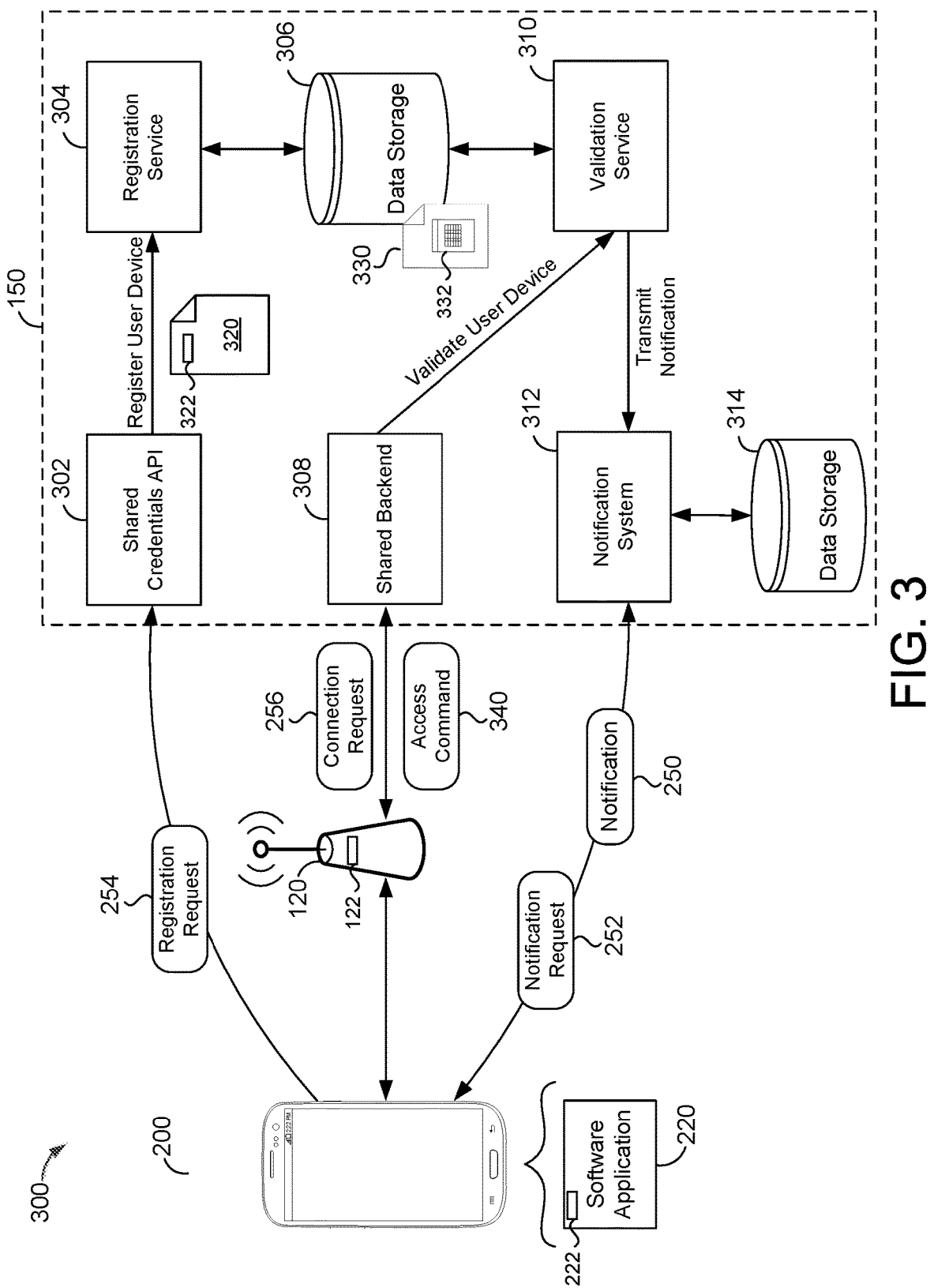
FIG. 3 is a schematic view of example components of a notification system.

Referring to FIG. 1, in some implementations, a system 100 includes a user device 200 associated with a user 10, who may be at, or near a venue 110 having an access point 120. The access point 120 is in communication, via a network 130, with a remote system 140. The remote system 140 may be a distributed system (e.g., cloud environment) having scalable/elastic resources 142. The resources 142 may include computing resources 144 and/or storage resources 146. The user device 200 may initiate access to the remote system 140 through the access point 120. In some implementations, the remote system 140 executes a backend service 150 that manages access to the remote system 140 (e.g., by granting or abrogating access). In some examples, the remote system 140 communicates with non-transitory data storage 170. The data storage 170 may collectively include data storage 306 and 314, described in further detail below with reference to FIG. 3. The network 130 may include various types of networks, such as a local area network (LAN), wide area network (WAN), and/or the Internet.

Although the network 130 may represent a long range network (e.g., Internet or WAN), in some implementations, the network 130 includes a shorter range network, such as a local area network (LAN). In some implementations, the network 130 uses standard communications technologies and/or protocols. Thus, the network 130 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 130 can use custom and/or dedicated data communications technologies instead of, or in addition to, the ones described above.

Figure 2:
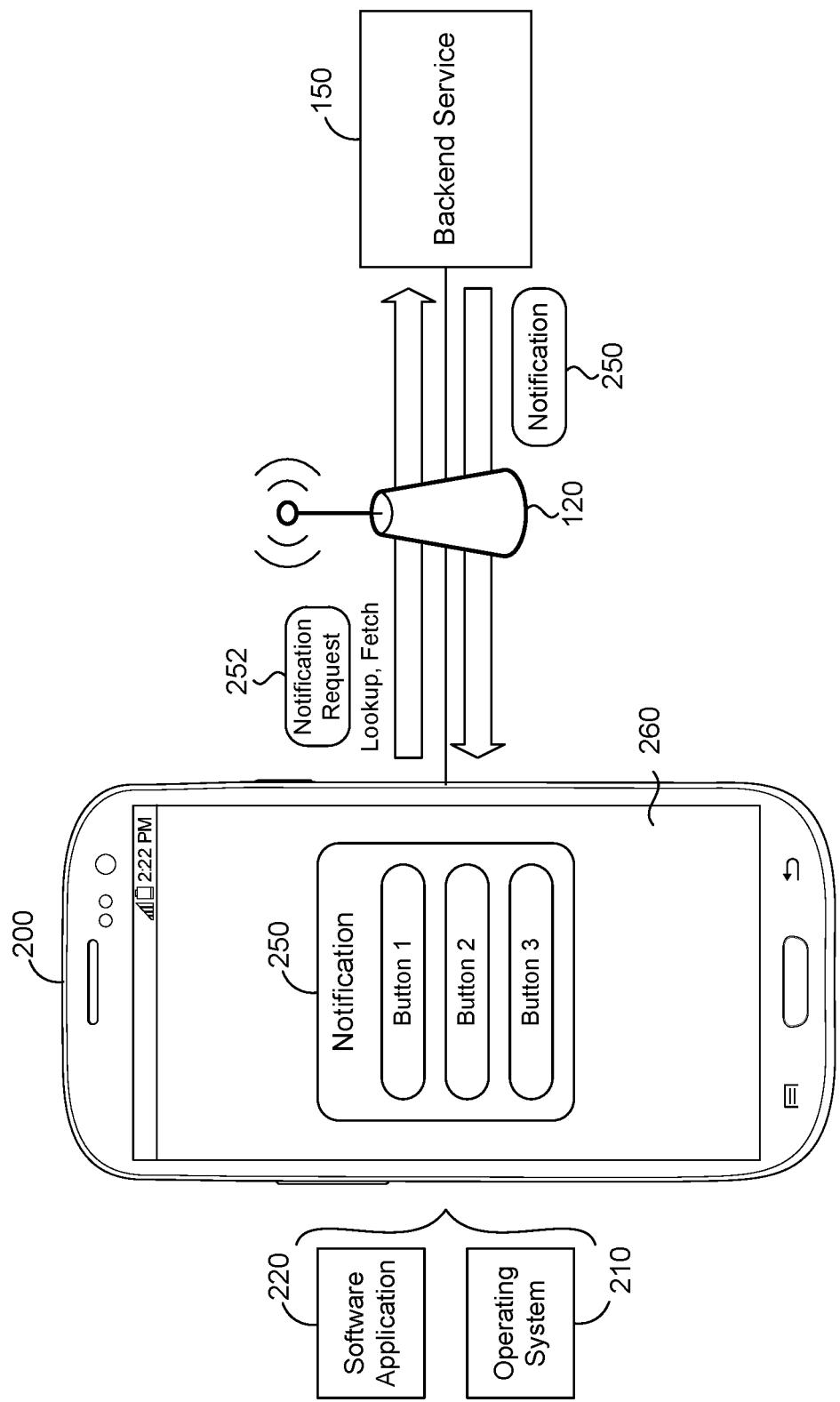
FIG. 2 is a schematic view of an example user device in communication with a backend service that manages access to a remote system through an access point.

FIG. 2 shows an example user device 200 in communication with the backend service 150. User devices 200 can be any computing devices that are capable of wireless communications with the access point 120. User devices 200 include, but are not limited to, mobile computing devices, such as laptops, tablets, smart phones, and wearable computing devices (e.g., headsets and/or watches).

The user devices 200 may use a variety of different operating systems 210. In examples where a user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 210 running on the user device 200 may include, but is not limited to, one of ANDROID®, IOS®, or WINDOWS PHONE®. In some examples a user device may run an operating system including, but not limited to, MICROSOFT WINDOWS® by Microsoft Corporation, MAC OS® by Apple, Inc., or Linux. User devices 200 may also access the backend service 150 while running operating systems 210 other than those operating systems 210 described above, whether presently available or developed in the future. The operating system 210 may execute one or more software applications 220.

A software application 220 may refer to computer software that, when executed by a computing device, causes the computing device to perform a task. In some examples, the software application 220 may be referred to as an "application", an "app", or a "program". Example software applications 220 include, but are not limited to, word processing applications, spreadsheet applications, messaging applications, media streaming applications, social networking applications, and games.

Applications 220 can be executed on a variety of different user devices 200. In some examples, applications 220 are installed on the user device 200 prior to the user 10 purchasing the user device 200. In other examples, the user 10 may download and install applications 220 on the user device 200.

In some implementations, the user device 200 executes a Wi-Fi application 220 that initiates communications with a recognized access point 120 to establish wireless communication with the access point 120. The backend service 150 may transmit a notification 250 through the access point 120 to the user device 200 when the user device 200 connects to the network 130 through the wireless access point 120. In some examples, the backend service 150 publishes a venue-specific notification 250 upon granting wireless access of the user device 200 and the wireless application 220 subscribes to the backend service 150 to look-up and fetch the venue-specific notification 250 published by the backend service 150. For example, the Wi-Fi application 220 may cause the user device 200 to transmit a notification request 252 to the backend service 150 through the access point 120 to fetch any pending venue-specific notifications 250 available for the user device 200 upon connecting to the network 130. In other examples, the backend service 150 transmits the venue-specific notification 250 as a push notification to the user device 200 in response to the backend service 150 identifying when the user device 200 connects to the network 130 through the access point 120.

In some implementations, the Wi-Fi application 220 renders the venue-specific notification 250 for display upon a graphical user interface (GUI) 260 executing on the user device 200 when the backend service 150 transmits the venue-specific notification 250 to the user device 200 through the access point 120. The notification 250 may indicate to the user 10 that the user device 200 has connected to the network 130. The notification 250 may include, but is not limited to, a title for the notification 250, descriptive text for the notification 250, URLs directed toward icons/logos associated with the venue 110, one or more links to direct the user 10 to a web page and/or a venue-specific application 220 executing on the user device 200. In some implementations, the notification 250 allows the user 10 to initiate, via a user input, one or more actions. For instance, the notification 250 may allow the user 10 to open the URL associated with the venue 110, open a venue-specific application 220 associated with the venue 110 executing on the user device 200, dismiss the notification 250, expand the notification 250, and/or initiate an explicit intent of the venue-specific application 220. As used herein, the term "initiate an explicit intent of the venue-specific application" refers to the user executing an action offered by the venue-specific application including, but not limited to, purchasing a product offered for sale by the venue 110, rate and/or review a product or service offered for sale by the venue 110, redeem a coupon offered by the venue 110, view a promotion offered by the venue 110, view a purchase history associated with the user 10, and view electronic funds associated with the user 10. In the example shown, the notification 250 displaying upon the GUI 260 includes Buttons 1-3 that each may receive a user input allowing the user 10 to initiate a corresponding action. In some examples, the user 10 initiates an action via a user input to the rendered notification 250 without selecting any buttons. User inputs can include any combination of touching or tapping the GUI 260, speech inputs, gesturing, manipulating a joystick or control button, eye gaze, and blinking Referring to FIG. 3, a block diagram of an example implementation of components of a notification system 300 for transmitting notifications to the user device 200 when the user device 200 connects to the network 130 is illustrated. The notification system 300 includes the user device 200, the wireless access point 120 and the backend service 150. The backend service 150 executes a shared credentials application Programming Interface 302 (hereinafter 'credentials API'), a registration service 304, a shared backend 308, a validation service 310 and a notification system 312. The backend service 150 may be in communication with data storage 306 and data storage 314, each including non-transitory memory for storing information.

In some implementations, the backend service 150 receives requests from the user device 200 through the access point 120. For example, the credentials API 302 may receive a registration request 254 from the user device 200, the shared backend 308 may receive a wireless connection request 256 from the user device 200 and the notification system 312 may receive a notification request 252 from the user device 200. In some examples, the user device 200 is required to transmit the registration request 254 to the credentials API 302 the first time the user device 200 desires to communicate with the backend service 150 to access the network 130. The registration request 254 can be transmitted to the credentials API 302 using any method and does not require that the access point 120 located in the venue 110 be used to facilitate the transmission of the registration request 254 to the credentials API 302. For instance, the registration request 254 may be transmitted through any access point 120 that provides access to the network 130. The registration request 254 may include pertinent information related to the user 10 and the user device 200 for registering with the backend service 150. The credentials API 302 may generate a user record 320 and corresponding user identifier 322 based on the pertinent information within the registration request 254, and the registration service 304 may store the user record 320 including the user identifier 322 within the data storage 306. In some implementations, the registration service 304 registers the user device 200 and inserts a new row into a data structure 330 within the data storage 306, the new row including the user identifier 322 identifying the user record 320. In some examples, the user record 320 includes one or more attributes associated with the user 10 and the user device 200. Example attributes of the user record 320 may include, but are not limited to, a media access control address associated with the user device 200, the operating system 210 of the user device 200, application information associated with one or more software applications 220 executing on the user device 200, and user information relating to user credentials for registering with the backend service 150. In some examples, the application information includes application identifiers associated with the one or more software applications 220. The user record 320 stored within the data storage 306 may subsequently be accessed by the validation service 310 for generating venue-specific notifications 250 associated with the user device 200 upon successful connection to the network 130. Simultaneously, the credentials API 302 may transmit the user identifier to the user device 200.

In some implementations, the shared backend 308 receives the wireless connection request 256 from the user device 200 to allow wireless connection of the user device 200 to the network 130 through the access point 120 located at the venue 110. In some examples, the shared backend 308 receives the wireless connection request 256 from the user device 200 through the access point 120 when the user device 200 is within a wireless coverage area of the access point 120, the connection request 256 initiated by the Wi-Fi application 220. The shared backend 308 may further identify that the user device 200 is located within the wireless coverage area of the access point 120. In some examples, the wireless connection request 256 received by the shared backend 308 includes the user identifier 322 generated by the credentials API 302 during a previous registration request 254 by the user device 200 and/or an access point identifier 122 associated with the access point 120. In some implementations, the shared backend 308 uses the user identifier 322 included within each wireless connection request 256 to authorize connection by the user device 200 to the network 130. In some examples, the shared backend 308 provides the wireless connection request 256 including the user identifier 322 to the validation service 310 to validate the user identifier 322 and authorize connection by the user device 200 to the network 130. When the user identifier 322 is valid, the validation service 310 may grant wireless access of the user device 200 to the access point 120. In one example, the shared backend 308 transmits a wireless connection command 340 to the access point 120 permitting the access point 120 to connect the user device 200 to the network 130. In some examples, in response to a connection request 256, the shared backend 308 executes a lookup (e.g., on the non-transitory memory 170 in communication with the backend computing device 142) of both the user information (e.g., based on device information) and the venue information (e.g., based on access point information).

Implementations are directed toward the notification system 312 of the backend service 150 transmitting a venue-specific notification 250 to the user device 200 through the access point 120 when the user device 200 connects to the network 130. In some implementations, the validation service 310 generates the venue-specific notification 250 using the user identifier 322 and/or the access point identifier 122 included in the wireless connection request 256.

In some examples, using the access point identifier 122 included in the wireless connection request 256, the validation service 310 retrieves venue-specific information 332 related to the venue 110 from the data storage 306 and generates the venue-specific information 250 based thereon. The data storage 306 may include venue-specific information 332 for a plurality of venues 110. When the venue 110 maintains multiple access points 120, each access point 120 may be associated with the same access point identifier 122. In some implementations, a corresponding row in a data structure 330 within the data storage 306 represents the access point identifier 122 identifying the venue-specific information 332. In one example, the venue-specific information 332 and associated access point identifier 122 stored within the data storage 306 for each venue 110 providing access to the network 130 is managed by an owner of the backend service 150. In another example, venues 110 are permitted to manage their own venue-specific information 332 stored within the data storage 306. The venue-specific information 332 may include one or more attributes associated with a configuration of the venue-specific notification 250. Example attributes of the venue-specific information 332 may include, but are not limited to, a title for the notification 250, descriptive text for the notification 250, URLs directed toward icons/logos associated with the venue 110, one or more links to direct the user 10 to a web page and/or a venue application identifier associated with a venue-specific application 220 (if executing on the user device 200) for the venue 110. The validation service 310 may generate the venue-specific notification 250 based upon the retrieved venue-specific information 332. In examples when the retrieved venue-specific information 332 includes the venue application identifier, the validation service 310 may determine whether or not the user device 200 executes a venue-specific application 220 associated with the venue application identifier. For instance, the validation service 310 may query the user record 320 stored within the data storage 306 to determine if the user record 320 includes the venue application identifier 222 associated with the venue 110. Thereafter, the validation service 310 may generate the venue-specific notification 250 based upon the retrieved venue-specific information 332 including the venue application identifier 222 when the user record 320 includes the venue application identifier 222 associated with the venue 110.

In another example, the validation service 310 additionally or alternatively retrieves application information from the data storage 306 using the user identifier 322 included in the wireless connection request 256, the application information related to one or more software applications 220 executing on the user device 200 and initiating the connection request 256. Thereafter, the validation service 310 may generate the venue-specific notification 250 based upon the retrieved application information.

In some implementations, upon generating the venue-specific notification 250, the validation service 310 transmits the venue-specific notification 250 to the notification system 312. The notification system 312 may configure and integrate venue-specific notifications 250 for rendering upon the operating systems 210 and application(s) 220 executing on the user devices 200. In the example shown, the notification system 312 may determine the operating system 210 executing on the user device 200 by querying the user record 320 stored within the data storage 306 using the user identifier 322 included within the wireless connection request 256. The notification system 312 may be in communication with the data storage 314 for storing the venue-specific notification 250 before the notification system 312 transmits the notification 250 to the user device 200 through the access point 120. In some examples, the notification system 312 publishes the venue-specific notification 250 for the user device 200 to look-up when the user device 200 connects to the network 130.

Implementations are directed toward the notification system 312 transmitting the venue-specific notification 250 to the user device 200 for rendering when the user device 200 connects to the network 130. In some examples, the notification system 312 receives a notification request 252 from the user device 200 to fetch any pending venue-specific notifications 250 available for the user-device 200. Here, the notification request 252 may be initiated by one or more applications 220 executing on the user device 200 when the user device 200 connects to the network 130. In response to the notification request 252, the notification system 312 retrieves the venue-specific notification 250 from the data storage 314 using the notification request 252 and transmits the venue-specific notification 250 from the notification system 312 to the user device 200 through the access point 120.

In some examples, the notification system 312 receives a notification request 252 from the user device 200 to look-up and get a published venue-specific notification 250. Here, the notification request 252 may be initiated by one or more applications 220 executing on the user device 200 when the user device 200 connects to the network 130. In response to the notification request 252, the notification system 312 retrieves the published venue-specific notification 250 from the data storage 314 and transmits the venue-specific notification 250 from the notification system 312 to the user device 200 through the access point 120.

In other examples, the backend service 150 identifies when the user device 200 connects to the network 130 and transmits the venue-specific notification 250 as a push notification to the user device 200 in response thereto. In some implementations, when the notification system 312 transmits the venue-specific notification 250 to the user device 200, the notification system 312 indicates the venue-specific notification 250 as read by the user device 200, and thus, no longer available for the user device 200.

Figure 4:
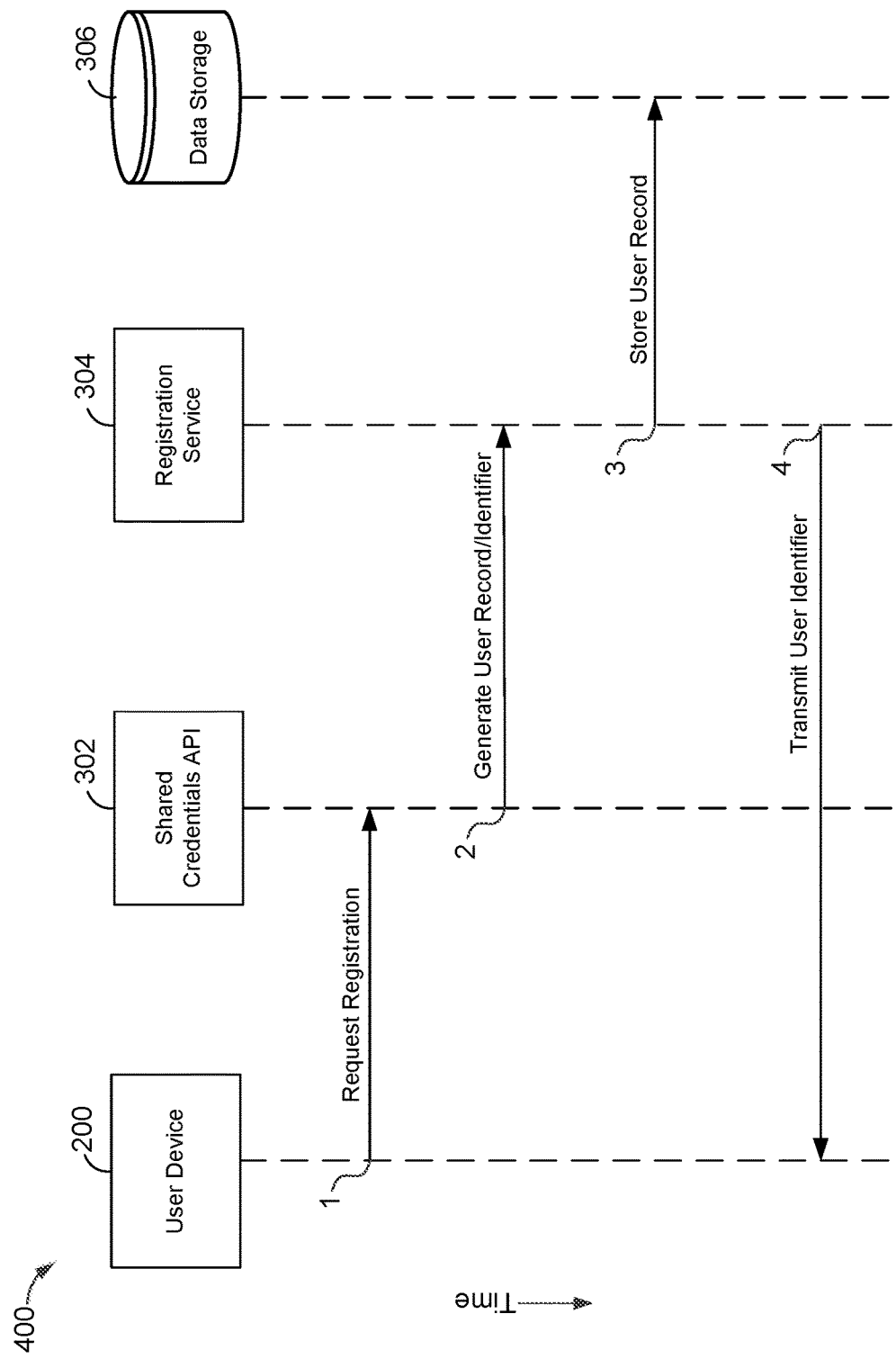
FIGS. 4 and 5 are schematic views of example operations performed by a backend service of the notification system of FIG. 3.

FIG. 4 is a diagram 400 illustrating example operations performed by the backend service 150 of the notification system 300 when a registration request 254 is received from the user device 200. The vertical y-axis indicates time increasing from the top to the bottom. At time 1, the user device 200 (initiated by Wi-Fi application 220) requests registration to the credentials API 302. The registration request 254 received by the credentials API 302 includes the pertinent information related to the user 10 and the user device 200 for registering with the backend service 150 for access to the network 130. At time 2, the credentials API 302 generates the user record 320 and the user identifier 322 associated therewith based on the pertinent information within the registration request 254. At time 3, the registration service 304 stores the user record 320 including the user identifier 322 within the non-transitory memory of the data storage 306 to register the user device 200. At time 4, the registration service 304 transmits the user identifier 322 to the user device 200. The user identifier 32 can be included within subsequent wireless connection requests 256 as a user name and password for authorizing and gaining access to the network 130.

Figure 5:
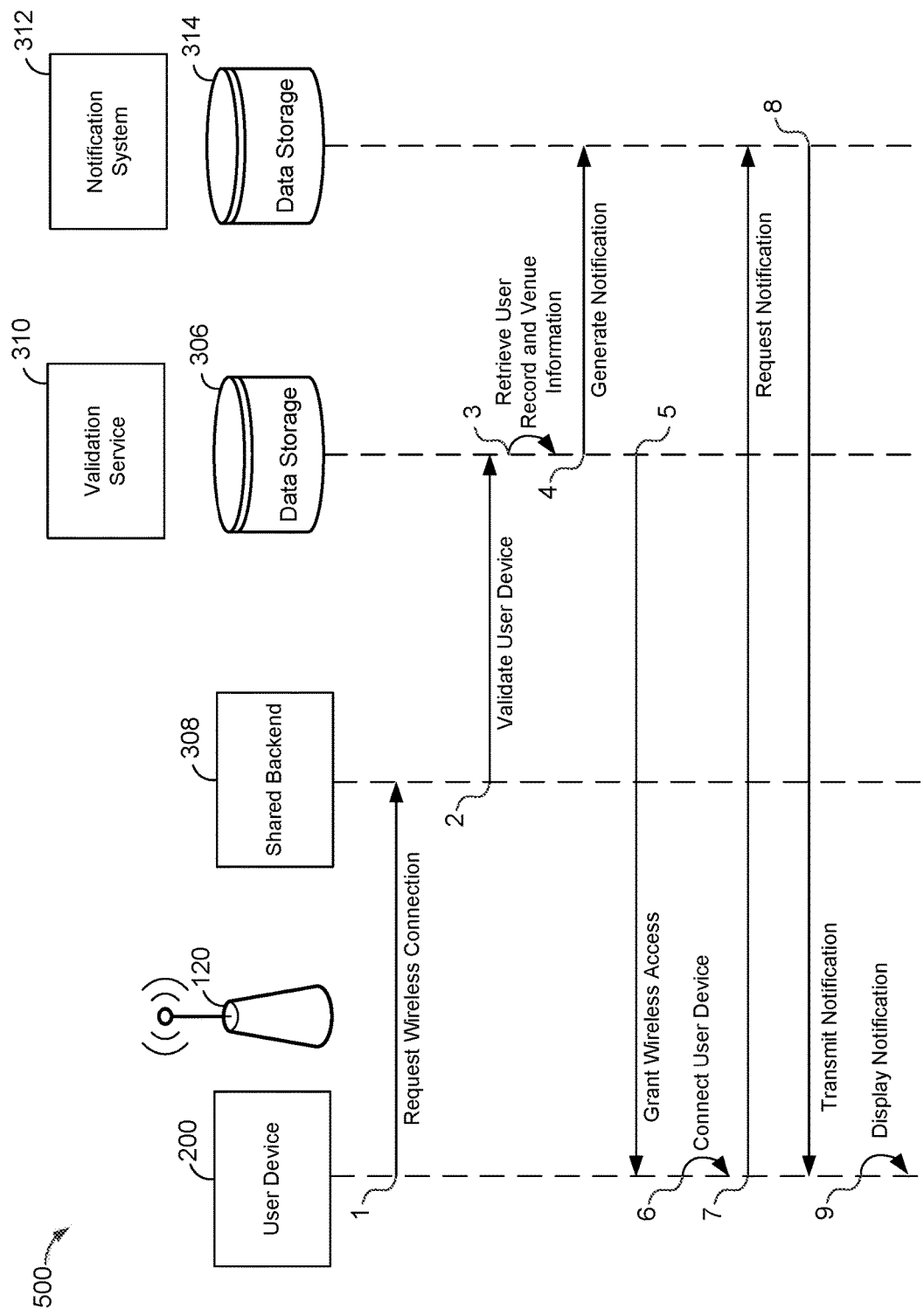

FIG. 5 is a diagram 500 illustrating example operations performed by the backend service 150 of the notification system 300 when a wireless connection request 256 is received from the user device 200. The vertical y-axis indicates time increasing from the top to the bottom. At time 1, the shared backend 308 may receive the wireless connection request 256 from the user device 200 to allow wireless connection of the user device 200 to the network 130 through the access point 120 located at the venue 110. The one or more applications 220 (e.g., Wi-Fi application 220 and/or venue-specific application 220) may initiate the wireless connection request 256 when the user device 200 is within the wireless coverage area of the access point 120. The wireless connection request 256 includes the user identifier and the access point identifier. At time 2, the shared backend 308 may validate the user identifier 322 including the user name and password for accessing the network 130 and provides the wireless connection request 256 including the user identifier and the access point identifier 122 to the validation service 310. At time 3, the validation service 310 may retrieve user information and the venue information from the non-transitory memory of the data storage 306 using the user identifier 322 and the access point identifier 122, respectively. The user information may include the application information related to the one or more applications 220 executing on the user device 200 and/or operating system information related to the operating system 210 executing on the user device 200.

At time 4, the validation service 310 may generate the venue-specific notification 250 that is published and stored within the non-transitory memory of the data storage 314. At time 5, the validation service 310 may grant wireless access of the user device 200 to the access point 120 when the user identifier 322 is valid. The user device 200 may wirelessly connect to the network 130 through the access point 120 at time 6. The user device 200 may wirelessly connect to the network 130 in response to the shared backend 308 transmitting the connection authorization command 340 to the access point 120, the connection authorization command 340 permitting the access point 120 to connect the user device 200 to the network 130.

At time 7, the user device 200 may request notifications 250 from the data storage 314. In the example shown, the notification system 312 may receive the notification request 252 from the user device 200 to fetch any pending venue-specific notifications 250 available for the user device 200. The Wi-Fi application 220 executing on the user device 200 may initiate the notification request 252 when the user device 200 connects to the network 130. At time 8, the notification system 312 transmits the venue-specific notification 250 to the user device 200. Optionally, the user device 200 may omit transmitting the notification request 252 to fetch pending venue-specific notifications 250, whereat the notification system 312 may transmit the venue-specific notification 250 as a push notification to the user device 200 in response to the notification system 312 identifying when the user device 200 connects to the network 130. The user 10 may select user preferences via the Wi-Fi application 220 to enable how the venue-specific notifications 250 are transmitted. At time 9, the venue-specific notification 250 transmitted from the notification system 312 may prompt the Wi-Fi application 220 executing on the user device 200 to render the notification 250 for display upon the GUI 260 executing on the user device 200. In some examples, the Wi-Fi application 220 is in sleep mode and is activated upon the user device 200 receiving the notification 250 from the notification system 312. The venue-specific notification 250 may non-obtrusively indicate to the user 10 that the user device 200 has connected to the network 130 without the user 10 having to access a captive portal associated with the venue 110.

Figure 6:
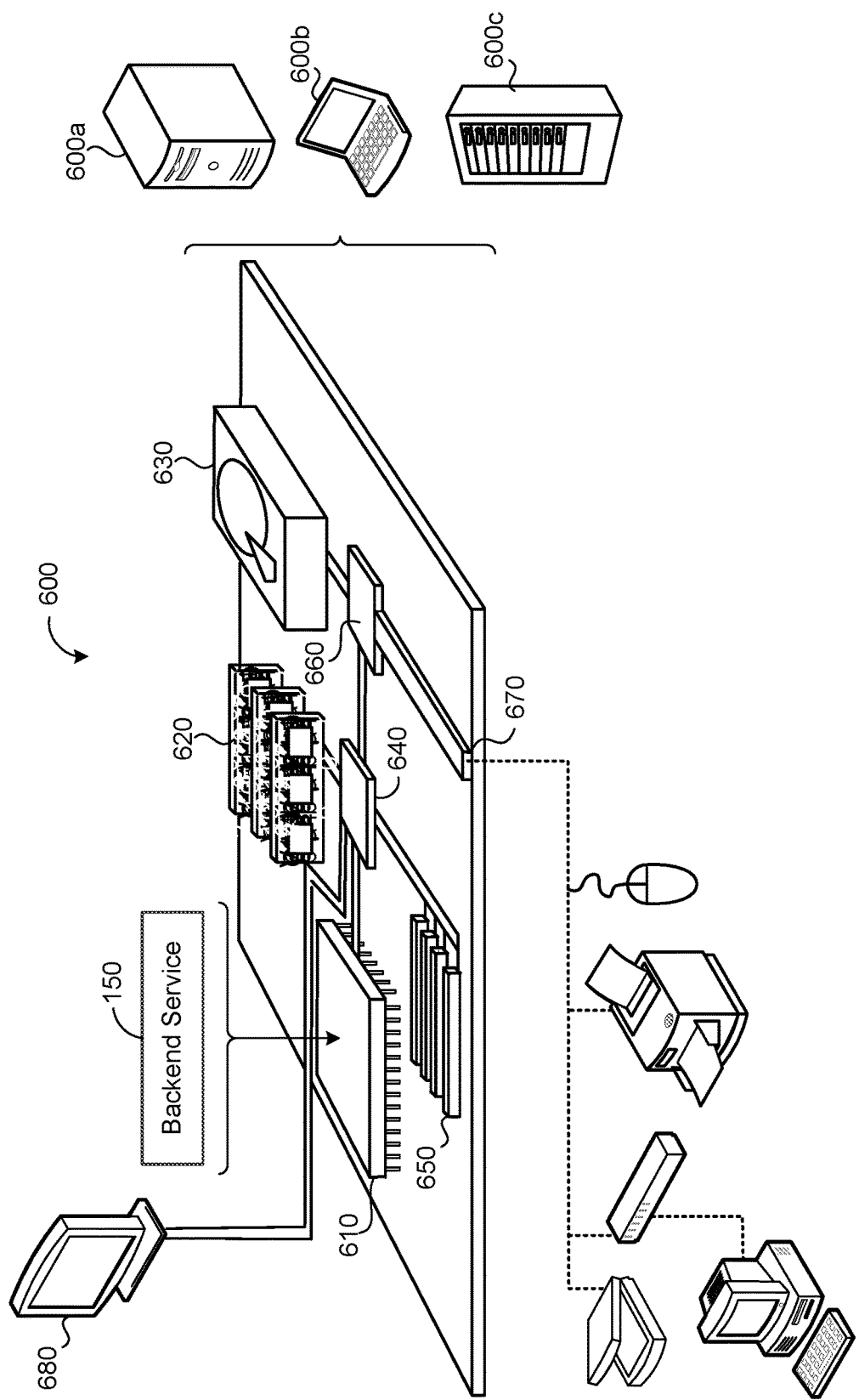
FIG. 6 is a schematic view of an example backend computing device of FIG. 3.

FIG. 6 is a schematic view of an example computing device 600 that may be used to implement the systems and methods described in this document, such as the backend service 150 and the computing device. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (i.e., processor), memory 620, a storage device 630, a high-speed interface/controller 640 connecting to the memory 620 and high-speed expansion ports 650, and a low speed interface/controller 660 connecting to a low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a GUI on an external input/output device, such as a display 680 coupled to a high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

In some implementations, the computing device 600 implementing the backend service 150 is in communication with data storage 170, 306 and 314 (e.g., in the memory 620). The processor 610 executes the backend service 150 including the credentials API 302, the registration service 304, the shared backend 308, the validation service 310 and the notification system 312. For example, the backend service 150 (executing on the processor 610) may receive a wireless connection request from a user device 200, validate a user identifier included within the connection request, grant wireless access of the user device 200 to an access point 120 when the user identifier is valid, and transmit a venue-specific notification 250 to the user device 200 when the user device 200 connects to the network 130. In some examples, the validation service 310 executing on the backend service 150 generates the venue-specific notification 250 based upon venue-specific information the validation service 310 retrieves from the non-transitory memory 620 (e.g., the data storage 306) using an access point identifier. In some examples, the validation service 310 generates the venue-specific notification 250 based upon application information the backend service 150 retrieves from the non-transitory memory 620 (e.g., the data storage 306) using the user identifier. In some examples, the validation service 310 generates the venue-specific notification 250 based upon both the venue-specific information and the application information.

In some implementations, the notification system 312 executing on the backend service 150 (executing on the processor 610), stores the venue-specific notification 250 in the non-transitory memory 620 (e.g., the data storage 314) for the user device 200 to fetch when the user device 200 connects to the network 130. In other examples, the notification system 312 publishes the venue-specific notification 250 in the non-transitory memory 620 (e.g., the data storage 314) for the user device 200 to look-up and get when the user device 200 connects to the network 130. In some examples, the notification system 312 identifies when the user device 200 connects to the network 130 and transmits the venue-specific notification 250 as a push notification to the user device 200 in response to identifying when the user device 200 connects to the network 130.

The backend service 150 executing the credentials API 302 may further receive a registration request from the user device 200, and in response to the registration request, the registration service 304 executing on the backend service 150 may generate a user record including the user identifier, store the user record in non-transitory memory 620 (e.g., in the data storage 306), and use the credentials API 302 to transmit the user identifier to the user device 200.

Figure 7:
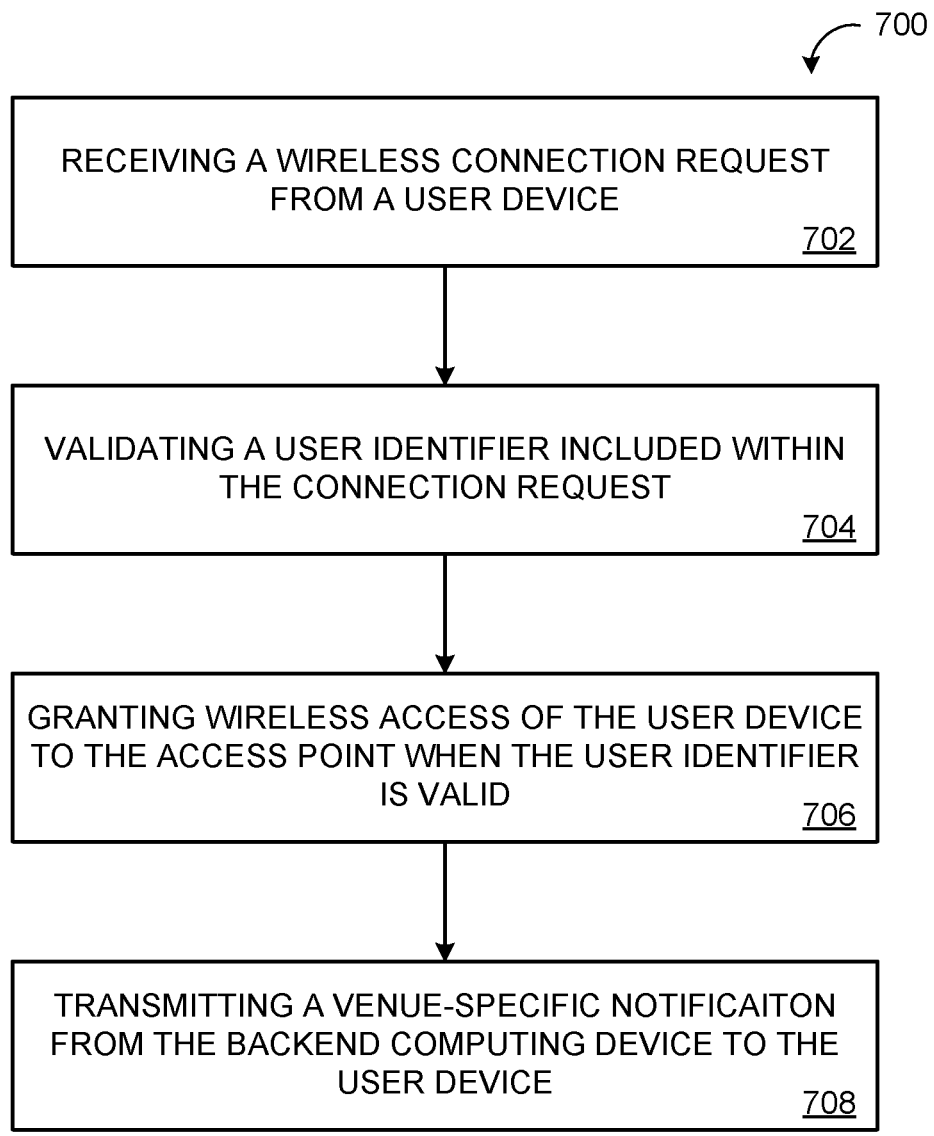
FIG. 7 is a flowchart of an example method for transmitting a venue-specific notification to a user device when the user device connects to a network.

FIG. 7 is a flowchart of an example method 700 executed by the computing device 600 of FIG. 6 for transmitting a venue-specific notification 250 to the user device 200 when the user device 200 connects to the network 130. The flowchart starts at operation 702 where a shared backend 308 receives a wireless connection request 256 from a user device 200 to allow wireless connection of the user device 200 to a network 130 through an access point 120 located at a venue 110, as illustrated in FIG. 5 at time 1. The connection request 256 includes a user identifier 322 and an access point identifier 122. In some implementations, the shared backend 308 receives the connection request 256 when the user device 200 is within a wireless coverage area of the access point 120. At operation 704, the shared backend 308 validates the user identifier 322, as illustrated in FIG. 5 at time 2. In some examples, a validation service 310 retrieves user record information using the user identifier 322 and venue information using the access point identifier 122, as illustrated in FIG. 5 at time 4. Thereafter, the validation service 310 may generate the venue-specific notification 250 based on at least one of the retrieved user and device information and the retrieved venue information, as illustrated in FIG. 5 at time 4. The user and device information may correspond to application information associated with one or more applications 220 executing on the user device 200 and/or operating system information associated with an operating system 210 executing on the user device 200. The validation service 310 may provide the generated notification 250 to the notification system 312. Implementations include any one of the notification system 312 publishing the notification 250 for the user device 200 to look-up and get, storing the notification 250 within the data storage 314 for the user device 200 to fetch and retrieve, and transmitting the notification 250 as a push notification in response to identifying when the user device connects to the network 130.

At operation 706, the backend service 150 grants wireless access of the user device 200 to the access point 120 when the user identifier is valid. At operation 708, the notification system 312 transmits the venue-specific notification 250 from the backend computing device to the user device 200 when the user device 200 connects to the network 130. In some examples, the notification system 312 receives a notification request 252 from the user device 200 to fetch any pending venue-specific notifications 250 available for the user device 200 when the user device 200 connects to the network 130. Here, the notification system 312 retrieves the venue-specific notification 250 from the data storage 314 in response to the notification request and transmits the notification 250 to the user device 200 through the access point 120. In other examples, the notification system 312 receives a notification request 252 from the user device 200 to get a venue-specific notification 250 published by the notification system 312. Here, the notification system 312 retrieves the published venue-specific notification 250 from the data storage 314 in response to the notification request transmitting the notification 250 to the user device 200 through the access point 120. One or more applications 220 executing on the user device 200 may initiate the notification request 252 upon the user device 200 connecting to the network 130. In some implementations, the notification system 312 identifies the notification 250 as being read and no longer available for the user device 200 upon the notification system 312 transmitting the notification 250.

Implementations include the notification system 312 transmitting the venue-specific notification 250 to the user device 200, the notification 250 prompting an application 220 (e.g., the Wi-Fi application) executing on the user device 200 to render the venue-specific notification 250 for display upon the GUI 260 to indicate to the user 10 that the user device 200 has connected to the network 130. The notification 250 rendered by the user device 200 may include a title for the notification 250, descriptive text for the notification 250, URLs directed toward icons/logos associated with the venue 110, one or more links to direct the user 10 to a web page and/or a venue-specific application 220 executing on the user device 200. The displayed notification 250 may allow the user 10 to initiate, via a user input, one or more actions. For instance, the notification 250 may allow the user 10 to open the URL associated with the venue 110, open a venue-specific application 220 associated with the venue 110 executing on the user device 200, dismiss the notification 250, expand the notification 250, and/or initiate an explicit intent of the venue-specific application 220. The user 10 may initiate the one or more actions via user inputs to any one of buttons 1-3 of the displayed notification 250.

In some implementations, the backend service 150 may be implemented to monitor user interaction with the venue-specific notifications 250. For instance, events related to venue-specific notifications 250 and corresponding subsequent user initiated actions can be tracked. Examples of tracked events may include, but are not limited to, the venue-specific notification 250 displayed upon the GUI 260 of the user device 200, dismissal of the notification 250 by the user 10, cancellation of the notification 250 by the Wi-Fi application 220 (e.g., when the user 10 exits the venue 110), expanding of the notification 250, and user-initiated actions to the notification 250. Additionally or alternatively, the backend service 150 may be implemented to monitor venue-specific notifications 250 in relation to specific venues 110 and/or specific venue locations. For instance, the aforementioned tracked events can be parameterized according to the venue 110 and/or location.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, at a backend computing device, a connection request from an access point located at a venue, the connection request comprising a user identifier corresponding to a user device requesting a wireless connection to a network through the access point;
   validating, by the backend computing device, the user identifier;
   when the user identifier is valid, transmitting a connection authorization command from the backend computing device to the access point, the connection authorization command permitting the access point to connect the user device to the network;
   determining, by the backend computing device, whether the user device establishes a wireless connection with the access point; and
   in response to the user device establishing the wireless connection with the access point, transmitting a venue-specific notification from the backend computing device to the user device.

2. The method of claim 1, wherein the venue-specific notification is the first notification received by the user device from the backend computing device.

3. The method of claim 1, further comprising receiving the connection request, at the backend computing device, from the user device through the access point when the user device is within a wireless coverage area of the access point.

4. The method of claim 3, further comprising, after receiving the connection request from the user device, identifying, at the backend computing device, that the user device is located within a wireless coverage area of the access point.

5. The method of claim 1, further comprising:
receiving, at the backend computing device, a registration request from the user device; and
in response to the registration request:
generating a user record comprising the user identifier;
storing the user record in non-transitory memory in communication with the backend computing device; and
transmitting the user identifier from the backend computing device to the user device.

6. The method of claim 5, wherein the user record comprises a media access control address associated with the user device.

7. The method of claim 5, wherein the user record comprises application information associated with one or more applications executing on the user device.

8. The method of claim 1, further comprising:
retrieving, using the backend computing device, venue-specific information from non-transitory memory in communication with the backend computing device using an access point identifier included in the connection request, the venue-specific information related to the venue; and
generating the venue-specific notification based upon the retrieved venue-specific information.

9. The method of claim 8, further comprising, after retrieving the venue-specific information, determining, by the backend computing device, that the venue-specific information comprises a venue application identifier; and
in response to the venue application identifier:
querying a user record stored in the non-transitory memory to determine if the user record comprises the venue application identifier associated with the venue; and
generating the venue-specific notification based upon the retrieved venue-specific information comprising the venue application identifier when the user record comprises the venue application identifier.

10. The method of claim 1, further comprising:
retrieving, using the backend computing device, application information from non-transitory memory in communication with the backend computing device using the user identifier included in the connection request, the application information related to one or more applications executing on the user device and initiating the connection request; and
generating the venue-specific notification based upon the retrieved application information.

11. The method of claim 1, further comprising:
identifying, at the backend computing device, when the user device connects to the network; and
in response to identifying when the user device connects to the network, transmitting the venue-specific notification as a push notification to the user device.

12. The method of claim 1, further comprising:
receiving, at the backend computing device, a notification request from the user device to fetch any pending venue-specific notifications available for the user device, the user device executing one or more applications initiating the notification request when the user device connects to the network; and
in response to the notification request:
retrieving the venue-specific notification from non-transitory memory in communication with the backend computing device; and
transmitting the venue-specific notification from the backend computing device to the user device.

13. The method of claim 1, further comprising:
publishing, using the backend computing device, the venue-specific notification for the user device to look-up when the user device connects to the network;
receiving, at the backend computing device, a notification request from the user device to get the published venue-specific notification, the user device executing one or more applications initiating the notification request when the user device connects to the network; and
in response to the notification request:
retrieving the published venue-specific notification from non-transitory memory in communication with the backend computing device; and
transmitting the venue-specific notification from the backend computing device to the user device.

14. The method of claim 1, wherein the venue-specific notification transmitted from the backend computing device prompts an application executing on the user device to render the venue-specific notification for display upon a graphical user interface executing on the user device, the venue-specific notification indicating to a user that the user device has connected to the network.

15. The method of claim 14, wherein the venue-specific notification displayed upon the graphical user interface prompts the user to initiate at least one of the following actions:
open a uniform resource locator associated with the venue;
open a venue-specific application associated with the venue executing on the user device;
dismiss the venue-specific notification;
expand the venue-specific notification; or
initiate an explicit intent of the venue-specific application when the venue-specific application is executing on the user device.

16. A system comprising:
data processing hardware; and
memory hardware in communication with the data processing hardware, the memory hardware storing instructions that when executed on the data processing hardware cause the data processing hardware to perform operations comprising:
receiving a connection request from an access point located at a venue, the connection request comprising a user identifier corresponding to a user device requesting a wireless connection to a network through the access point;
validating the user identifier;
when the user identifier is valid, transmitting a connection authorization command to the access point, the connection authorization command permitting the access point to connect the user device to the network; and
determining whether the user device establishes a wireless connection with the access point; and
in response to the user device establishing the wireless connection with the access point, transmitting a venue-specific notification to the user device.

17. The system of claim 16, wherein the venue-specific notification is the first notification received by the user device from the data processing hardware.

18. The system of claim 16, wherein the operations further comprise receiving the connection request from the user device through the access point when the user device is within a wireless coverage area of the access point.

19. The system of claim 18, wherein the operations further comprise, after receiving the connection request from the user device, identifying that the user device is located within a wireless coverage area of the access point.

20. The system of claim 16, wherein the operations further comprise:
   receiving a registration request from the user device; and
   in response to the registration request:
      generating a user record comprising the user identifier;
      storing the user record in the memory hardware; and
      transmitting the user identifier to the user device.

21. The system of claim 20, wherein the user record comprises a media access control address associated with the user device.

22. The system of claim 21, wherein the user record comprises application information associated with one or more applications executing on the user device and initiating the registration request.

23. The system of claim 16, wherein the operations further comprise:
   retrieving venue-specific information from the memory hardware using an access point identifier included in the connection request, the venue-specific information related to the venue; and
   generating the venue-specific notification based upon the retrieved venue-specific information.

24. The system of claim 23, wherein the operations further comprise, after retrieving the venue-specific information, determining that the venue-specific information comprises a venue application identifier; and
   in response to the venue application identifier:
      querying a user record stored in the memory hardware to determine if the user record comprises the venue application identifier associated with the venue; and
      generating the venue-specific notification based upon the retrieved venue-specific information comprising the venue application identifier when the user record comprises the venue application identifier.

25. The system of claim 16, wherein the operations further comprise:
   retrieving application information from the memory hardware using the user identifier included in the connection request, the application information related to one or more applications executing on the user device and initiating the connection request; and
   generating the venue-specific notification based upon the retrieved application information.

26. The system of claim 16, wherein the operations further comprise:
   identifying when the user device connects to the network; and
   in response to identifying when the user device connects to the network, transmitting the venue-specific notification as a push notification to the user device.

27. The system of claim 16, wherein the operations further comprise:
   receiving a notification request from the user device to fetch any pending venue-specific notifications available for the user device, the user device executing one or more applications initiating the notification request when the user device connects to the network; and
   in response to the notification request:
      retrieving the venue-specific notification from the memory hardware; and
      transmitting the venue-specific notification to the user device.

28. The system of claim 16, wherein the operations further comprise:
   publishing the venue-specific notification for the user device to look-up when the user device connects to the network;
   receiving a notification request from the user device to get the published venue-specific notification, the user device executing one or more applications initiating the notification request when the user device connects to the network; and
   in response to the notification request:
      retrieving the published venue-specific notification from the memory hardware; and
      transmitting the venue-specific notification to the user device.

29. The system of claim 16, wherein the transmitted venue-specific notification prompts an application executing on the user device to render the venue-specific notification for display upon a graphical user interface executing on the user device, the venue-specific notification indicating to a user that the user device has connected to the network.

30. The system of claim 29, wherein the venue-specific notification displayed upon the graphical user interface prompts the user to initiate at least one of the following actions:
   open a uniform resource locator associated with the venue;
   open a venue-specific application associated with the venue executing on the user device;
   dismiss the venue-specific notification;
   expand the venue-specific notification; or
   initiate an explicit intent of the venue-specific application when the venue-specific application is executing on the user device.

* * * * *